US009564635B2

(12) United States Patent
Lim et al.

(10) Patent No.: US 9,564,635 B2
(45) Date of Patent: Feb. 7, 2017

(54) LITHIUM SECONDARY BATTERY WITH EXCELLENT PERFORMANCE

(71) Applicant: LG Chem, Ltd., Seoul (KR)

(72) Inventors: Soo Hyun Lim, Daejeon (KR); Jae Hyun Lee, Daejeon (KR); Youn Kyoung Lee, Seoul (KR)

(73) Assignee: LG Chem, Ltd. (KR)

( * ) Notice: Subject to any disclaimer, the term of this patent is extended or adjusted under 35 U.S.C. 154(b) by 151 days.

(21) Appl. No.: 14/465,963

(22) Filed: Aug. 22, 2014

(65) Prior Publication Data

US 2014/0363714 A1 Dec. 11, 2014

Related U.S. Application Data

(63) Continuation of application No. PCT/KR2013/003258, filed on Apr. 17, 2013.

(30) Foreign Application Priority Data

Apr. 17, 2012 (KR) ........................ 10-2012-0039450

(51) Int. Cl.
*H01M 4/505* (2010.01)
*H01M 4/485* (2010.01)
(Continued)

(52) U.S. Cl.
CPC ............ *H01M 4/505* (2013.01); *H01M 4/485* (2013.01); *H01M 4/525* (2013.01);
(Continued)

(58) Field of Classification Search
CPC .. H01M 10/42; H01M 10/4257; H01M 10/04; H01M 10/052; H01M 4/505; H01M 4/485; H01M 4/525
See application file for complete search history.

(56) References Cited

U.S. PATENT DOCUMENTS 6,392,385 B1 5/2002 Barker et al.
2004/0110064 A1 6/2004 Kitao et al.
(Continued)

FOREIGN PATENT DOCUMENTS

CN 1744368 3/2006
CN 101958428 A 1/2011
(Continued)

OTHER PUBLICATIONS

International Search Report for Application No. PCT/KR2013/003258 dated Jul. 15, 2013.

*Primary Examiner* — Karie O'Neill Apicella
(74) *Attorney, Agent, or Firm* — Lerner, David, Littenberg, Krumholz & Mentlik, LLP

(57) ABSTRACT

Disclosed is a lithium secondary battery including an electrode assembly including a cathode, an anode, and a separator disposed between the cathode and the anode and an electrolyte, wherein the cathode includes a spinel-structure lithium manganese composite oxide represented by Formula 1 below as a cathode active material, and the lithium secondary battery has a charge cut-off voltage of 3.3 to 4 V and, when the charge cut-off voltage is reached, the anode has a potential of 0.75 to 1.545 V within a range within which a potential of the cathode does not exceed 4.95 V:

$$Li_xM_yMn_{2-y}O_{4-z}A_z \quad (1)$$

wherein $0.9 \leq x \leq 1.2$, $0 < y < 2$, and $0 \leq z < 0.2$;
M is at least one element selected from the group consisting of Al, Mg, Ni, Co, Fe, Cr, V, Ti, Cu, B, Ca, Zn, Zr, Nb, Mo, Sr, Sb, W, Ti, and Bi; and
A is at least one monovalent or divalent anion.

18 Claims, 3 Drawing Sheets

(51) Int. Cl.
  *H01M 4/525* (2010.01)
  *H01M 10/04* (2006.01)
  *H01M 10/052* (2010.01)
  *H01M 10/058* (2010.01)
  *H01M 10/0585* (2010.01)
  *H01M 10/42* (2006.01)

(52) U.S. Cl.
  CPC ..... *H01M 10/045* (2013.01); *H01M 10/0413* (2013.01); *H01M 10/0431* (2013.01); *H01M 10/052* (2013.01); *H01M 10/058* (2013.01); *H01M 10/0585* (2013.01); *H01M 2010/4292* (2013.01); *H01M 2220/20* (2013.01); *Y02E 60/122* (2013.01); *Y02T 10/7011* (2013.01)

(56) References Cited

U.S. PATENT DOCUMENTS

| | | |
|---|---|---|
| 2005/0170250 A1 | 8/2005 | Ohzuku et al. |
| 2006/0046155 A1 | 3/2006 | Inagaki et al. |
| 2007/0059602 A1 | 3/2007 | Morishima et al. |
| 2008/0118833 A1 | 5/2008 | Ueda et al. |
| 2010/0171466 A1 | 7/2010 | Spitler et al. |
| 2011/0070498 A1 | 3/2011 | Mao et al. |
| 2011/0171539 A1 | 7/2011 | Patoux et al. |

FOREIGN PATENT DOCUMENTS

| | | | | |
|---|---|---|---|---|
| EP | 1285468 | A1 | 2/2003 | |
| EP | 2381506 | A1 | 10/2011 | |
| JP | 2003323893 | A | 11/2003 | |
| JP | 2004171955 | A | 6/2004 | |
| JP | 2006066341 | A | 3/2006 | |
| JP | 2011-029122 | A | 2/2011 | |
| JP | 2011526057 | A | 9/2011 | |
| JP | 2012033279 | A * | 2/2012 | ........ H01M 10/0525 |
| KR | 2008-0105637 | A | 12/2008 | |
| KR | 20090008075 | A | 1/2009 | |
| KR | 2009-0129500 | A | 12/2009 | |
| WO | 2012014793 | A1 | 2/2012 | |

* cited by examiner

[A LAYER]

[B LAYER]

[A LAYER AND B LAYER'S FOLDING]

A LAYER  A LAYER  B LAYER  B LAYER  A LAYER  A LAYER  B LAYER  B LAYER  A LAYER

LITHIUM SECONDARY BATTERY WITH EXCELLENT PERFORMANCE

CROSS-REFERENCE TO RELATED APPLICATIONS

The present application is a continuation of International Patent Application No. PCT/KR2013/003258, filed Apr. 17, 2013, which claims the priority from Korean Application No. 10-2012-0039450, filed Apr. 17, 2012, in the Korean Intellectual Property Office, the disclosures of which are incorporated herein by reference.

TECHNICAL FIELD

The present invention relates to a lithium secondary battery with excellent performance and, more particularly, to a lithium secondary battery including: an electrode assembly including a cathode, an anode, and a separator disposed between the cathode and the anode; and an electrolyte, wherein the cathode includes a spinel-structure lithium manganese composite oxide represented by a particular chemical formula as a cathode active material, the lithium secondary battery has a charge cut-off voltage of 3.3 to 4 V, and, when the charge cut-off voltage is reached, the anode has a potential of 0.75 to 1.545 V within a range within which a potential of the cathode does not exceed 4.95 V.

BACKGROUND ART

As mobile device technology continues to develop and demand therefor continues to increase, demand for secondary batteries as energy sources is rapidly increasing. Among these secondary batteries, lithium secondary batteries, which have high energy density and operating voltage, long cycle lifespan, and low self-discharge rate, are commercially available and widely used.

In addition, as interest in environmental problems is recently increasing, research into electric vehicles (EVs), hybrid EVs (HEVs), and the like that can replace vehicles using fossil fuels, such as gasoline vehicles, diesel vehicles, and the like, which are one of the main causes of air pollution, is actively underway. As a power source of EVs, HEVs, and the like, a nickel metal-hydride secondary battery is mainly used. However, research into lithium secondary batteries having high energy density, high discharge voltage and output stability is actively underway and some lithium secondary batteries are commercially available.

A lithium secondary battery has a structure in which an electrode assembly, in which a porous separator is interposed between a cathode and an anode, each of which includes an active material coated on an electrode current collector, is impregnated with a lithium salt-containing non-aqueous electrolyte. Carbon-based materials are mainly used as anode active materials, and lithium cobalt-based oxides, lithium manganese-based oxides, lithium nickel-based oxides, lithium composite oxides, and the like are mainly used as cathode active materials.

Among such cathode active materials, as a representative example, $LiCoO_2$ exhibits good electrical conductivity, high output voltage, and excellent electrode characteristics and is commercially available. However, $LiCoO_2$ is disadvantageous in terms of economic efficiency according to natural abundance and raw material costs and in terms of environment, e.g., harm to human bodies. $LiNiO_2$ is relatively inexpensive and exhibits high discharge capacity, but is difficult to synthesize and has thermal stability problems in a charged state. In addition, manganese-based electrode materials such as $LiMn_2O_4$, $LiMnO_2$, and the like are easy to synthesize and inexpensive, exhibit good electrochemical discharge properties, and are less harmful to the environment and thus are widely applied as active materials. However, these manganese-based electrode materials have low conductivity and theoretical capacity and high operating voltage and thus an electrolyte is likely to decompose.

In addition, when a high-voltage cathode is used, an electrolyte is oxidized because it reaches an oxidation potential and thus gases and byproducts are generated and, accordingly, battery performance is deteriorated and resistance increases. Consequently, batteries have severe safety problems.

Therefore, there is an urgent need to develop technology for secondary batteries that do not have such problems and operate at high voltage.

DISCLOSURE

Technical Problem

The present invention aims to address the aforementioned problems of the related art and to achieve technical goals that have long been sought.

As a result of a variety of extensive and intensive studies and experiments, the inventors of the present invention confirmed that, as described below, when a secondary battery including a lithium manganese composite oxide as a cathode active material has a particular range of charge cut-off voltage and an anode has a particular potential when the charge cut-off voltage is reached, desired effects may be achieved, thus completing the present invention.

Technical Solution

In accordance with one aspect of the present invention, provided is a lithium secondary battery including: an electrode assembly including a cathode, an anode, and a separator disposed between the cathode and the anode; and an electrolyte, wherein the cathode includes a spinel-structure lithium manganese composite oxide represented by Formula 1 below as a cathode active material, the lithium secondary battery has a charge cut-off voltage of 3.3 to 4 V, and, when the charge cut-off voltage is reached, the anode has a potential of 0.75 to 1.545 V within a range within which a potential of the cathode does not exceed 4.95 V.

$$Li_xM_yMn_{2-y}O_{4-z}A_z \qquad (1)$$

wherein $0.9 \leq x \leq 1.2$, $0 < y < 2$, $0 \leq z < 0.2$;

M is at least one element selected from the group consisting of Al, Mg, Ni, Co, Fe, Cr, V, Ti, Cu, B, Ca, Zn, Zr, Nb, Mo, Sr, Sb, W, Ti, and Bi; and A is at least one monovalent or divalent anion.

The charge cut-off voltage as used herein means a difference between potentials of a cathode and an anode when cut-off occurs and such a charge cut-off voltage is set to prevent oxidation of an electrolyte at high voltage.

Thus, in a specific embodiment, to more efficiently prevent oxidation of an electrolyte, the charge cut-off voltage may be, particularly, 3.3 to 3.5 V. In this case, when the charge cut-off voltage is reached, the anode may have a potential of 1.2 to 1.545 V within a range within which the potential of the cathode does not exceed 4.95 V.

The inventors of the present invention discovered that, when a high-voltage cathode including the lithium manganese composite oxide described above is used, an oxidation potential of an electrolyte is easily reached and thus the electrolyte is oxidized and, accordingly, gases and byproducts are generated, which results in a reduction in battery performance and an increase in resistance. Thus, as a result of intensive and extensive studies, the inventors of the present invention confirmed that, when a lithium secondary battery satisfies the above-described conditions, oxidation of an electrolyte may be prevented even when a high-voltage cathode is used. That is, when a charge cut-off voltage is within the above-described range and an anode has the potential within the above-described range, a potential of a cathode reaches the charge cut-off voltage prior to increase to the oxidation potential of an electrolyte and, accordingly, electrolyte oxidation may be prevented.

In a specific embodiment, the lithium manganese composite oxide may be a lithium nickel manganese complex oxide (LNMO) represented by Formula 2 below, more particularly $LiNi_{0.5}Mn_{1.5}O_4$ or $LiNi_{0.4}Mn_{1.6}O_4$.

$$Li_xNi_yMn_{2-y}O_4 \quad (2)$$

wherein $0.9 \leq x \leq 1.2$ and $0.4 \leq y \leq 0.5$.

The LNMO is a spinel-structure composite oxide having a relatively high potential and has a high voltage of 4.7 V as compared to an existing cathode having a voltage of 3.5 to 4.3 V and thus is more effective in application to these batteries.

On the other hand, in a specific embodiment, the anode may include, as an anode active material, a lithium metal oxide represented by Formula 3 below:

$$Li_aM'_bO_{4-c}A_c \quad (3)$$

wherein M' is at least one element selected from the group consisting of Ti, Sn, Cu, Pb, Sb, Zn, Fe, In, Al, and Zr;

$0.1 \leq a \leq 4$ and $0.2 \leq b \leq 4$ wherein a and b are determined according to oxidation number of M';

$0 \leq c < 0.2$ wherein c is determined according to oxidation number of A; and A is at least one monovalent or divalent anion.

In particular, the lithium metal oxide may be a lithium titanium oxide (LTO) represented by Formula 4 below, particularly $Li_{0.8}Ti_{2.2}O_4$, $Li_{2.67}Ti_{1.33}O_4$, $LiTi_2O_4$, $Li_{1.33}Ti_{1.67}O_4$, $Li_{1.14}Ti_{1.71}O_4$, or the like. However, compositions and kinds thereof are not particularly limited so long as the lithium metal oxide is capable of intercalating/deintercalating lithium ions. More particularly, the lithium metal oxide may be a spinel-structure LTO with small change in crystal structure during charge and discharge and excellent reversibility, such as $Li_{1.33}Ti_{1.67}O_4$ or $LiTi_2O_4$.

$$Li_aTi_bO_4 \quad (4)$$

wherein $0.5 \leq a \leq 3$ and $1 \leq b \leq 2.5$.

Meanwhile, when a carbon-based material is used as a conventional anode active material, a lithium compound is produced at an anode surface and thus reversible capacity is reduced. Due to this problem, an anode has to have greater capacity than that of a cathode. Nevertheless, when the lithium metal oxide is used, lithium plating may be prevented and thus cell design through limitation of anode capacity is possible.

Thus, in a specific embodiment, the anode may have a smaller or the same capacity as that of the cathode. When the capacity of the anode is too low, desired capacity may not be obtained due to a significant decrease in capacity. Thus, in particular, the capacity of the anode may be 80 to 100%, more particular 90 to 100% the capacity of the cathode.

In a specific embodiment, type of the electrode assembly is not particularly limited. In particular, the electrode assembly may be a stack-type electrode assembly, a jelly-roll type electrode assembly, or a stack/folding type electrode assembly having a structure in which unit cells, each of which includes a cathode, an anode, and a separator, are positioned on a separator film and the resultant structure is wound. More particularly, the electrode assembly may be a stack/folding type electrode assembly.

Among these electrode assemblies, unit cells constituting the stack-type electrode assembly or stack/folding type electrode assembly may be a bicell or a full cell, or a bicell or a full cell may be used in combination. A bicell has a structure in which the same kind of electrodes are positioned at opposite sides of the cell, for example, a structure of cathode/separator/anode/separator/cathode or a structure of anode/separator/cathode/separator/anode. A full cell has a structure in which different kinds of electrodes are positioned at opposite sides of the cell, for example, a structure of cathode/separator/anode.

In addition, the outermost electrodes of the stack-type electrode assembly or stack/folding type electrode assembly may be double-sided coated or single-sided coated, in particular single-sided coated. In the single-sided coated case, heat generation is reduced during needle penetration and, accordingly, battery safety may be enhanced.

In such a stack-type electrode assembly or stack/folding type electrode assembly, as described above, a total capacity of anodes may be made lower than a total capacity of cathodes by, in particular, decreasing the number of anodes in an electrode assembly. For example, assuming that a unit cell having a cathode/separator/anode/separator/cathode structure is denoted as "A-type bicell," and a unit cell having an anode/separator/cathode/separator/anode structure is denoted as "C-type bicell," in a case in which A-type bicells and C-type bicells are stacked or assembled in a folding manner, the A-type bicells are positioned at the outermost sides of an electrode assembly, or unit cells are arranged on a separator film such that the A-type bicells are positioned at the outmost sides of an electrode assembly and wound and, accordingly, the number of cathodes is greater than the number of anodes and, consequently, the total capacity of anodes is lower than the total capacity of cathodes. Meanwhile, in a stack/folding type electrode assembly, methods of arranging unit cells on a separator film are not particularly limited so long as cathodes are positioned at the outermost sides of an electrode assembly.

As such, conditions according to the present invention may be satisfied by making the capacity of the anode lower or the same as the capacity of the cathode.

Other elements of the lithium secondary battery according to the present invention will now be described.

The cathode is manufactured by coating, on a cathode current collector, a mixture of a cathode active material, a conductive material, and a binder and drying and pressing the coated cathode current collector. As desired, the mixture may further include a filler.

The cathode current collector is generally fabricated to a thickness of 3 to 500 μm. The cathode current collector is not particularly limited so long as it does not cause chemical changes in the fabricated battery and has high conductivity. For example, the cathode current collector may be made of stainless steel, aluminum, nickel, titanium, sintered carbon, or aluminum or stainless steel surface-treated with carbon, nickel, titanium, silver, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

As the cathode active material, in addition to the lithium manganese composite oxide, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_{2-x}O_4$ where $0 \leq x \leq 0.33$, $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides having the formula $LiNi_{1-x}M_xO_2$ where M=Co, Mn, Al, Cu, Fe, Mg, B, or Ga, and $0.01 \leq x \leq 0.3$; lithium manganese composite oxides having the formula $LiMn_{2-x}M_xO_2$ where M=Co, Ni, Fe, Cr, Zn, or Ta, and $0.01 \leq x \leq 0.1$ or the formula $Li_2Mn_3MO_8$ where M=Fe, Co, Ni, Cu, or Zn; $LiMn_2O_4$ where some of the Li atoms are substituted with alkaline earth metal ions; disulfide compounds; and $Fe_2(MoO_4)_3$ may be used alone or in combination, but embodiments of the present invention are not limited thereto.

The conductive material is typically added in an amount of 1 to 50 wt % based on a total weight of a mixture including a cathode active material. There is no particular limit as to the conductive material, so long as it does not cause chemical changes in the fabricated battery and has conductivity. Examples of conductive materials include, but are not limited to, graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between an active material and a conductive material and in binding of the active material to a current collector. The binder may be typically added in an amount of 1 to 50 wt % based on a total weight of a mixture including a cathode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene-butadiene rubber, fluorine rubber, and various copolymers.

The filler is optionally used as a component to inhibit cathode expansion. The filler is not particularly limited so long as it is a fibrous material that does not cause chemical changes in the fabricated secondary battery. Examples of the filler include olefin-based polymers such as polyethylene and polypropylene; and fibrous materials such as glass fiber and carbon fiber.

On the other hand, the anode is manufactured by coating an anode active material on an anode current collector and drying and pressing the coated anode current collector. As described, a conductive material, a binder, a filler, and the like as described above may be further selectively used.

The anode current collector is generally fabricated to a thickness of 3 to 500 μm. The anode current collector is not particularly limited so long as it does not cause chemical changes in the fabricated battery and has conductivity. For example, the anode current collector may be made of copper, stainless steel, aluminum, nickel, titanium, sintered carbon, copper or stainless steel surface-treated with carbon, nickel, titanium, silver, or the like, or aluminum-cadmium alloys. Similar to the cathode current collector, the anode current collector may also have fine irregularities at a surface thereof to increase adhesion between the anode active material and the anode current collector. In addition, the anode current collector may be used in any of various forms including films, sheets, foils, nets, porous structures, foams, and non-woven fabrics.

Examples of the anode active material include, but are not limited to, carbon such as hard carbon and graphite-based carbon; metal composite oxides such as $Li_xFe_2O_3$ where $0 \leq x \leq 1$, $Li_xWO_2$ where $0 \leq x \leq 1$, $Sn_xMe_{1-x}Me'_yO_z$ where Me: Mn, Fe, Pb, or Ge; Me': Al, B, P, Si, Groups I, II and III elements, or halogens; $0 < x \leq 1$; $1 \leq y \leq 3$; and $1 \leq z \leq 8$; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni-based materials; and titanium oxides.

The separator is disposed between the cathode and the anode and an insulating thin film having high ion permeability and mechanical strength is used as the separator. The separator typically has a pore diameter of 0.01 to 10 μm and a thickness of 5 to 300 μm. As the separator, sheets or non-woven fabrics made of an olefin polymer such as polypropylene, glass fibers or polyethylene, which have chemical resistance and hydrophobicity, are used. When a solid electrolyte such as a polymer is used as the electrolyte, the solid electrolyte may also serve as a separator.

The electrolyte contains a lithium salt and may be a non-aqueous organic solvent, an organic solid electrolyte, an inorganic solid electrolyte, or the like, but embodiments of the present invention are not limited thereto.

For example, the non-aqueous organic solvent may be an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte. Examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), or the like.

In a specific embodiment, a lithium salt-containing non-aqueous electrolyte may be prepared by adding a lithium salt such as $LiPF_6$, $LiClO_4$, $LiBF_4$, $LiN(SO_2CF_3)_2$, or the like to a mixed solvent of a cyclic carbonate such as EC or PC, which is a high dielectric solvent, and a linear carbonate such as DEC, DMC, or EMC, which is a low-viscosity solvent.

The present invention also provides a battery module including the secondary battery as a unit battery and a battery pack including the battery module.

The battery pack may be used as a power source of devices that require high-temperature stability, long cycle characteristics, high rate characteristics, and the like.

Examples of the devices include, but are not limited to, electric motor-driven power tools; electric vehicles (EVs), hybrid electric vehicles (HEVs), and plug-in hybrid electric vehicles (PHEVs); electric two-wheeled vehicles such as e-bikes and e-scooters; electric golf carts; and systems for storing power.

BRIEF DESCRIPTION OF THE DRAWINGS

The above and other objects, features and other advantages of the present invention will be more clearly understood from the following detailed description taken in conjunction with the accompanying drawings, in which.

MODE FOR INVENTION

Now, embodiments of the present invention will be described with reference to the accompanying drawings. These embodiments are provided for illustrative purposes only and should not be construed as limiting the scope and spirit of the present invention.

Figure 1:
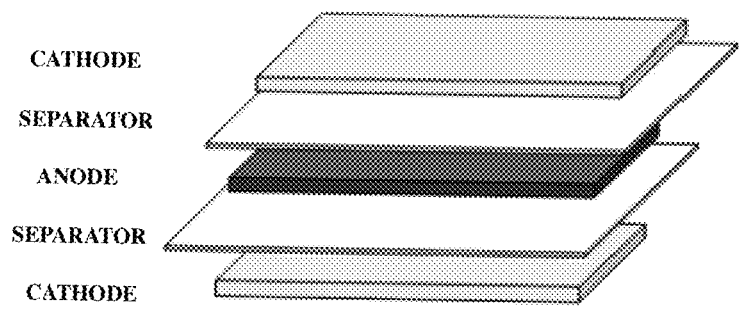
FIG. 1 is a view illustrating an example of a unit cell.

FIG. 1 is a view illustrating an example of a unit cell.

Referring to FIG. 1, an A layer has a cathode/separator/anode/separator/cathode structure and means the A-type bicell described in the present specification.

Figure 2:
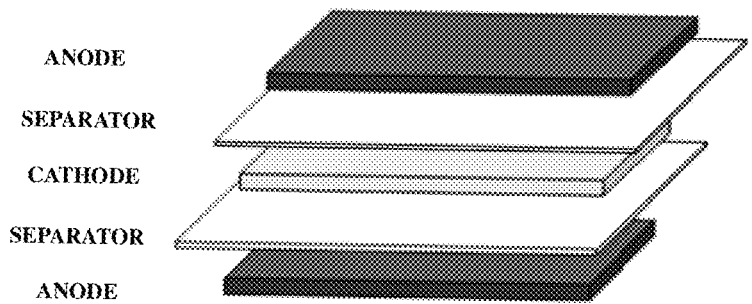
FIG. 2 is a view illustrating another example of a unit cell.

FIG. 2 is a view illustrating another example of a unit cell.

Referring to FIG. 2, a B layer has an anode/separator/cathode/separator/anode structure and means the C-type bicell described in the present specification.

Figure 3:
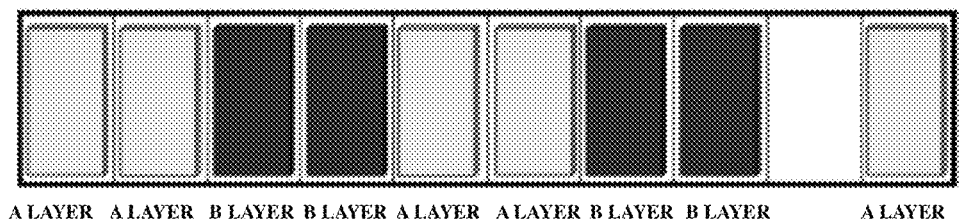
FIG. 3 is a method of arranging unit cells on a separator film when manufacturing a stack/folding type electrode assembly.

FIG. 3 is a method of arranging unit cells on a separator film when manufacturing a stack/folding type electrode assembly.

When folding the separator film using a method illustrated in FIG. 3, the A-type bicells are positioned at the outermost sides of an electrode assembly and thus the outermost electrodes are cathodes, and a greater number of the A-type bicells is arranged than the number of the C-type bicells and thus the capacity of anodes is lower than that of cathodes.

Hereinafter, the present invention will be described in further detail with reference to the following examples, but these examples should not be construed as limiting the scope and spirit of the present invention.

Example 1

$Li_{1.33}Ti_{1.67}O_4$ as an anode active material, Denka black as a conductive material, and PVdF as a binder were added in a weight ratio of 90:5:5 to NMP and mixed therein to prepare an anode mixture. Subsequently, the anode mixture was coated onto 20 μm Al foil and the coated Al foil was pressed and dried, thereby completing fabrication of an anode.

In addition, $LiNi_{0.5}Mn_{1.5}O_4$ as a cathode active material, Denka black as a conductive material, and PVdF as a binder was added in a weight ratio of 90:5:5 to NMP and mixed therein to prepare a cathode mixture. Subsequently, the cathode mixture was coated onto 20 μm Al foil and the coated Al foil was pressed and dried, thereby completing fabrication of a cathode.

By interposing separators (thickness: 20 μm) between the prepared cathodes and anodes, a plurality of A-type bicells (see FIG. 1) having a unit stacked structure of cathode/separator/anode/separator/cathode and a plurality of C-type bicells having a unit stacked structure of anode/separator/cathode/separator/anode were manufactured.

In a winding process, the A-type bicells and the C-type bicells are positioned on a long and continuous separator film such that cathodes and anodes face each other at stacked interfaces therebetween. In this regard, the A-type bicells are positioned at the outermost sides of an electrode assembly. The separator film with the A-type and B-type bicells stacked thereon was wound to manufacture an electrode assembly, the electrode assembly was accommodated in a pouch-type battery case, a lithium salt-containing non-aqueous electrolyte in which ethyl carbonate, dimethyl carbonate, and ethyl methyl carbonate were mixed in a volume ratio of 1:1:1 and that contains 1M $LiPF_6$ as a lithium salt was injected thereinto, and the resulting battery case was sealed, thereby completing manufacture of a lithium secondary battery.

Comparative Example 1

A lithium secondary battery was manufactured in the same manner as in Example 1, except that C-type bicells were positioned at the outermost sides of the electrode assembly and wound to manufacture an electrode assembly.

Experimental Example 1

Cut-off voltages of the secondary batteries manufactured according to Example 1 and Comparative Example 1 were set to 3.5 V and anode and cathode potentials of each secondary battery were measured when the cut-off voltage was reached. Results are shown in Table 1 below.

TABLE 1

| | Anode potential (V) | Cathode potential (V) |
|---|---|---|
| Example 1 | 1.26 | 4.76 |
| Comparative Example 1 | 1.5 | 5.0 |

Referring to Table 1, in the secondary battery of Example 1, the potential of the anode is 1.26 V when the cut-off voltage is reached and thus the potential of the cathode is 4.76 V and, accordingly, the potential of the cathode reaches the cut-off voltage before reaching an oxidation potential of an electrolyte. By contrast, in the secondary battery of Comparative Example 1, the potential of the anode is 1.5 V when the cut-off voltage is reached and thus the potential of the cathode is 5.0V and thus reaches an oxidation potential of an electrolyte.

Experimental Example 2

Evaluation of Lifespan Characteristics of Secondary Battery

The secondary batteries of Example 1 and Comparative Example 1 were subjected to charging and discharging at 1 C and 600 mA in a range of 2 to 3.35 V. Changes in charge capacity of each battery were measured while 50 charging and discharging cycles were repeated at room temperature. Results are shown in FIG. 4.

Figure 4:
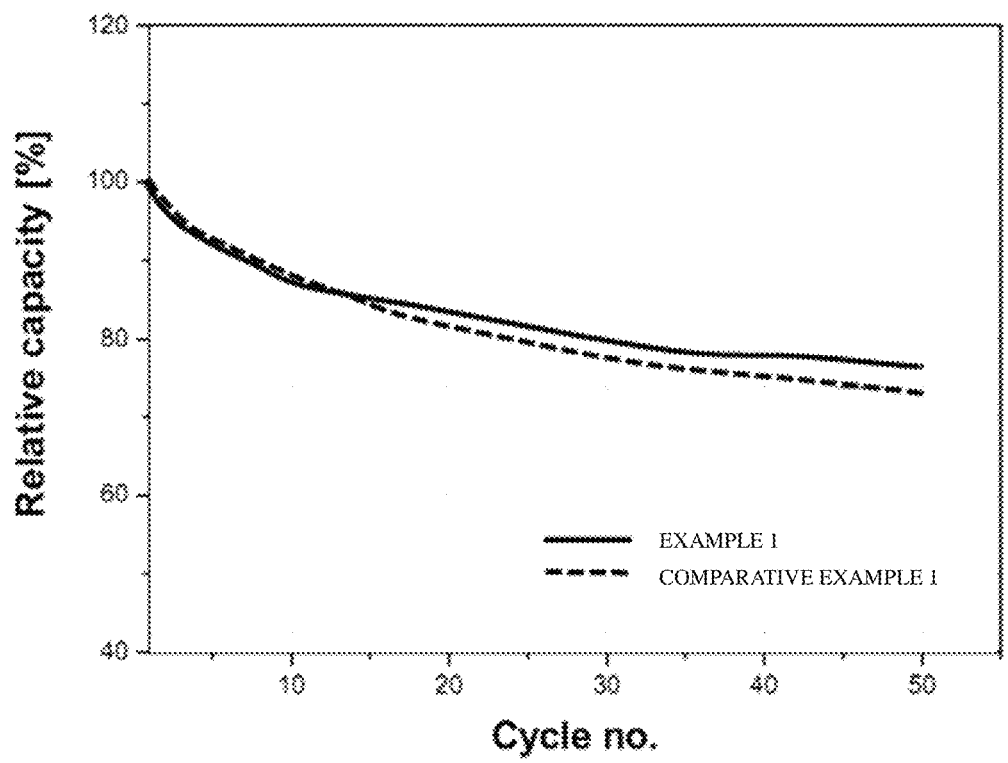
FIG. 4 is a graph showing comparison between lifespan characteristics according to Experimental Example 2.

Referring to FIG. 4, the secondary battery of Example 1 exhibits a capacity retention ratio of approximately 77%, while the secondary battery of Comparative Example 1 exhibits a capacity retention ratio of approximately 72%. From the results, it can be confirmed that the battery of Example 1 exhibits less reduction in charge capacity than that of the battery of Comparative Example 1 even when charging and discharging processes are repeated.

Experimental Example 3

Measurement of Gas Generation Amount of Secondary Battery

The secondary batteries of Example 1 and Comparative Example 1 were subjected to charging and discharging at 1 C and 600 mA in a range of 2 to 3.35 V and 50 charging and discharging cycles are repeated at room temperature. Gas generation amounts were measured during 50 cycles and measurement results are shown in FIG. 5.

Figure 5:
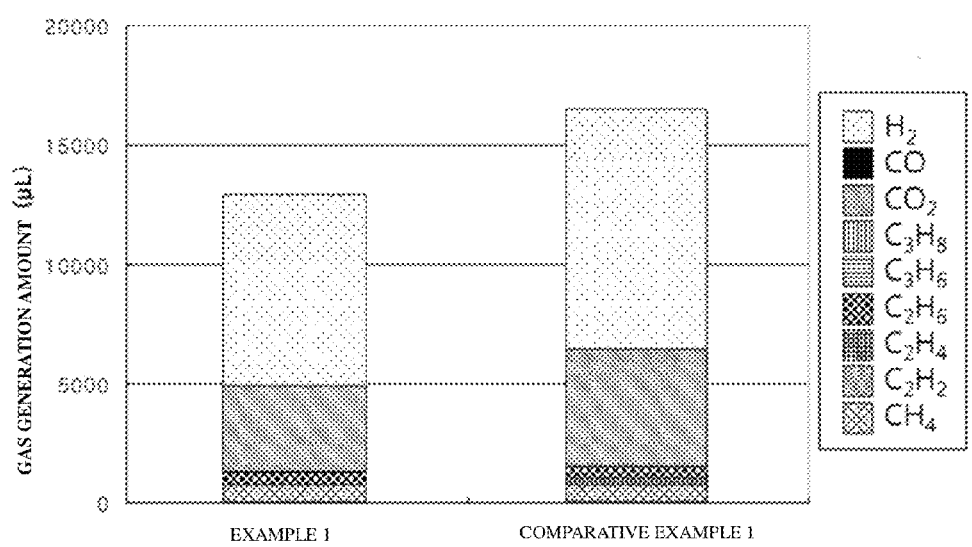
FIG. 5 is a graph showing comparison between gas generation amounts according to Experimental Example 3.

Referring to FIG. 5, it can be confirmed that the battery of Example 1 exhibits smaller gas generation amounts than those of the battery of Comparative Example 1.

From the results shown in FIG. 5, it can be confirmed that, when the secondary battery according to the present invention is used, generation of gases in the battery is suppressed and thus expansion of the battery is prevented and lifespan characteristics of the battery are enhanced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, a lithium secondary battery according to the present invention has a particular range of charge cut-off voltage and an anode has a particular potential when the charge cut-off voltage is reached and thus, even when a high-voltage cathode including a lithium manganese composite oxide as a cathode active material is used, an increase of the potential of a cathode to an oxidation potential or greater of an electrolyte is prevented and thus oxidation of the electrolyte is prevented, which results in enhancement of secondary battery performance.

The invention claimed is:

1. A lithium secondary battery comprising: an electrode assembly comprising a cathode, an anode, and a separator disposed between the cathode and the anode; and an electrolyte, wherein the capacity of the anode is 80 to 100% the capacity of the cathode, wherein the cathode comprises a spinel-structure lithium manganese composite oxide represented by Formula 1 below as a cathode active material, and the lithium secondary battery has a charge cut-off voltage of 3.3 to 4 V and, when the charge cut-off voltage is reached, the anode has a potential of 0.75 to 1.545 V within a range within which a potential of the cathode does not exceed 4.95 V:

$$Li_xM_yMn_{2-y}O_4-zA_z \quad (1)$$

wherein $0.9 \le x \le 1.2$, $0 < y < 2$, and $0 \le z < 0.2$;

M is at least one element selected from the group consisting of Al, Mg, Ni, Co, Fe, Cr, V, Ti, Cu, B, Ca, Zn, Zr, Nb, Mo, Sr, Sb, W, Ti, and Bi; and A is at least one monovalent or divalent anion.

2. The lithium secondary battery according to claim 1, wherein the charge cut-off voltage of the lithium secondary battery is in a range of 3.3 to 3.5 V and, when the cut-off voltage is reached, the anode has a potential of 1.2 to 1.545 V within a range within which the potential of the cathode does not exceed 4.95 V.

3. The lithium secondary battery according to claim 1, wherein the lithium manganese composite oxide of Formula 1 is a lithium nickel manganese complex oxide represented by Formula 2 below:

$$Li_xNi_yMn_{2-y}O_4 \quad (2)$$

wherein $0.9 \le x \le 1.2$ and $0.4 \le y \le 0.5$.

4. The lithium secondary battery according to claim 3, wherein the lithium nickel manganese complex oxide is LiNi0.5Mn1.5O4 or LiNi0.4Mn1.6O4.

5. The lithium secondary battery according to claim 1, wherein the anode comprises, as an anode active material, a lithium metal oxide represented by Formula 3 below:

$$Li_aM'_bO_4-cA_c \quad (3)$$

wherein M' is at least one element selected from the group consisting of Ti, Sn, Cu, Pb, Sb, Zn, Fe, In, Al, and Zr;

$0.1 \le a \le 4$ and $0.2 \le b \le 4$ wherein a and b are determined according to oxidation number of M';

$0 \le c < 0.2$ wherein c is determined according to oxidation number of A; and

A is at least one monovalent or divalent anion.

6. The lithium secondary battery according to claim 5, wherein the lithium metal oxide of Formula 3 is a lithium titanium oxide (LTO) represented by Formula 4 below:

$$Li_aTi_bO_4 \quad (4)$$

wherein $0.5 \le a \le 3$ and $1 \le b \le 2.5$.

7. The lithium secondary battery according to claim 6, wherein the LTO is Li1.33Ti1.67O4 or LiTi2O4.

8. The lithium secondary battery according to claim 1, wherein the electrode assembly is a stack-type electrode assembly, a jelly-roll type electrode assembly, or a stack/folding type electrode assembly fabricated by positioning, on a separator film, unit cells comprising cathodes, anodes, and separators and winding the separator film with the unit cells positioned thereon.

9. The lithium secondary battery according to claim 8, wherein electrodes at outermost sides of the stack-type electrode assembly or stack/folding type electrode assembly are double-sided coated.

10. The lithium secondary battery according to claim 8, wherein electrodes at outermost sides of the stack-type electrode assembly or stack/folding type electrode assembly are single-sided coated.

11. The lithium secondary battery according to claim 8, wherein the stack-type electrode assembly or stack/folding type electrode assembly comprises, at outermost sides thereof, A-type bicells, each A-type bicell having a structure of cathode/separator/anode/separator/cathode.

12. The lithium secondary battery according to claim 1, wherein the potential of the anode is lower than or identical to the capacity of the cathode.

13. The lithium secondary battery according to claim 12, wherein the capacity of the anode is 80 to 100% the capacity of the cathode.

14. The lithium secondary battery according to claim 13, wherein a total capacity of anodes constituting the electrode assembly is 90 to 100% a total capacity of cathodes constituting the electrode assembly.

15. A battery module comprising the lithium secondary battery according to claim 1 as a unit battery.

16. A battery pack comprising the battery module according to claim 15.

17. A device comprising the battery pack according to claim 16.

18. The device according to claim 17, wherein the device is an electric vehicle, a hybrid electric vehicle, a plug-in hybrid electric vehicle, or a system for storing power.

* * * * *